July 10, 1934.  J. J. KAUFMANN  1,966,411
COOKING APPARATUS
Filed Dec. 30, 1931  2 Sheets-Sheet 1
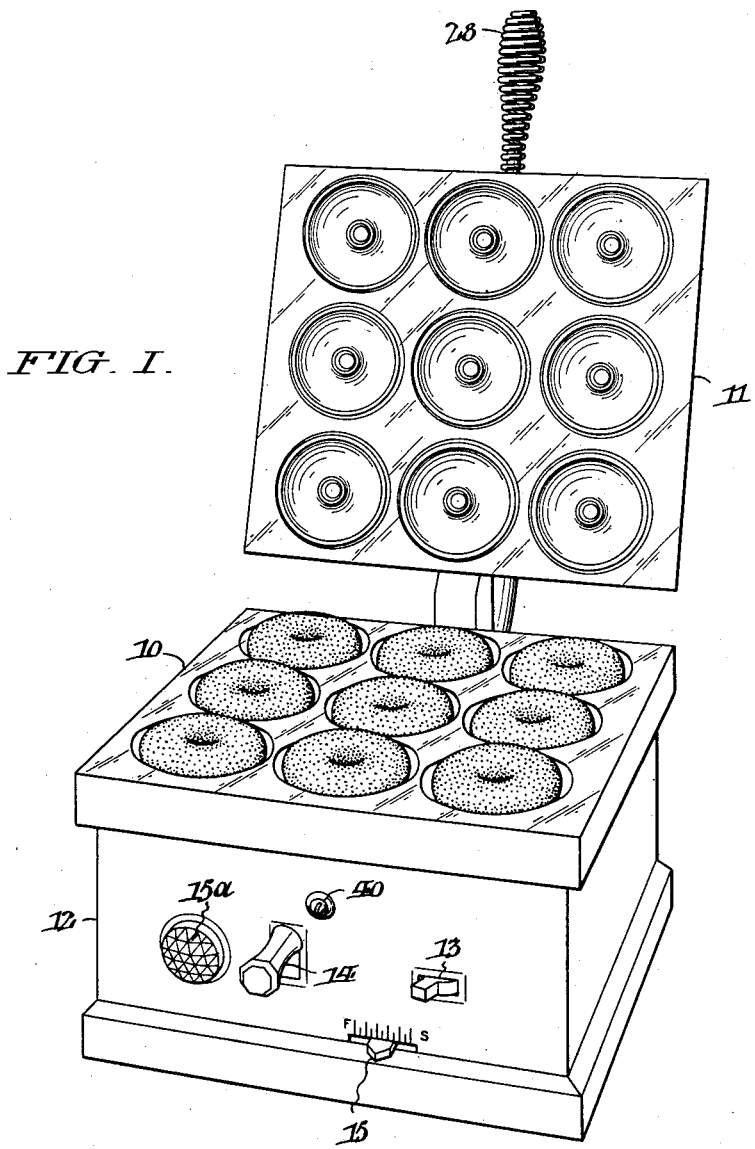
FIG. I.

July 10, 1934.  J. J. KAUFMANN  1,966,411
COOKING APPARATUS
Filed Dec. 30, 1931   2 Sheets-Sheet 2
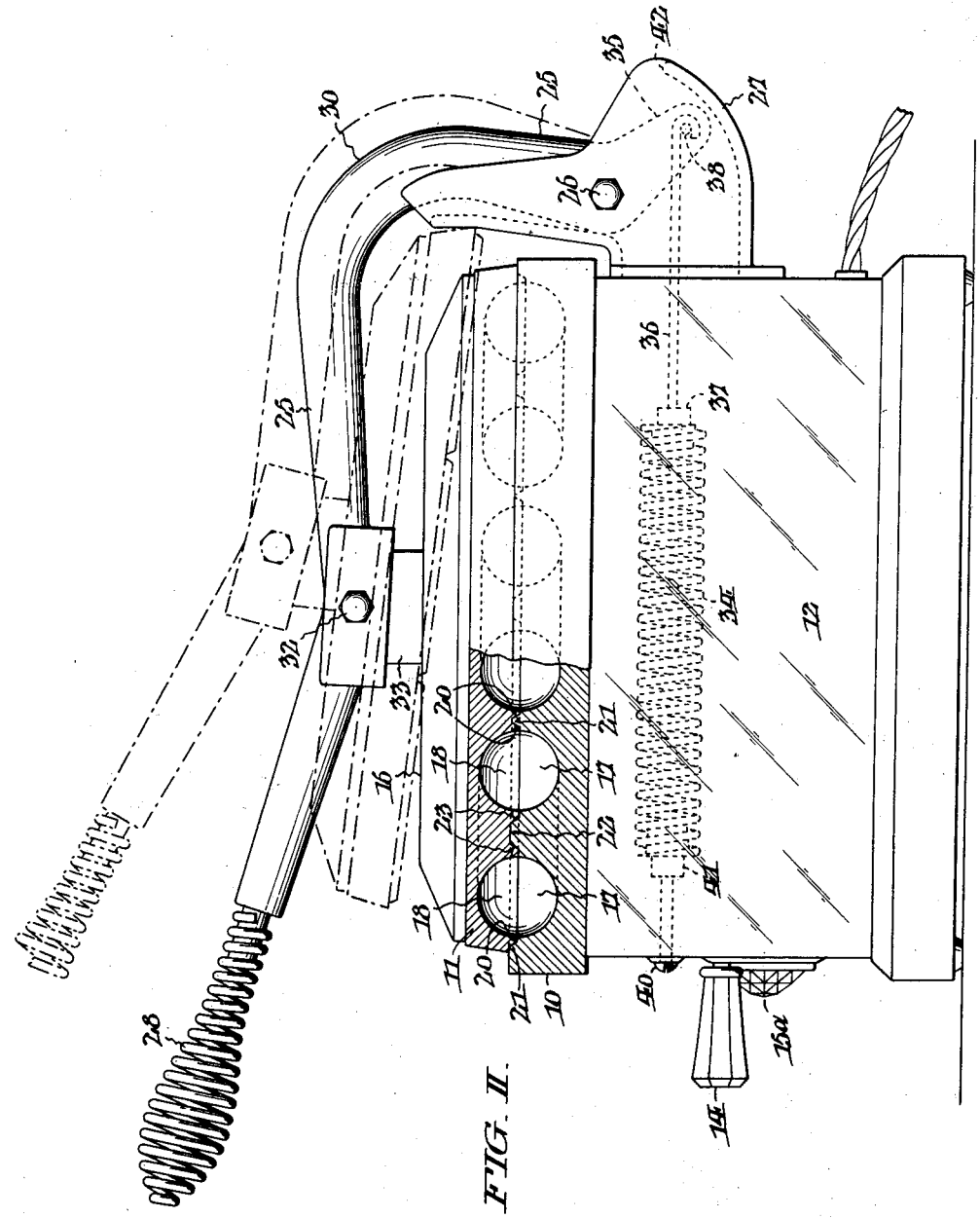
FIG. II.
WITNESSES:
John A. Weidler
William Bell, Jr.
INVENTOR:
James J. Kaufmann,
BY
ATTORNEYS.

Patented July 10, 1934

1,966,411

UNITED STATES PATENT OFFICE 1,966,411

COOKING APPARATUS

James J. Kaufmann, Baltimore, Md., assignor to Doughnut Machine Corporation, New York, N. Y., a corporation of New York Application December 30, 1931, Serial No. 583,947

1 Claim. (Cl. 53—10)

My invention relates to cooking apparatus for dough or batter products and the like such as cakes like doughnuts, etc. I aim to provide a simple and reliable cooker that is easy and convenient to use, will produce products of perfect form when correctly charged with dough or batter. In suitable forms of construction, my cooker will permit full expansion or rising of all the doughnuts or cakes in it even when it is overcharged, without any objectionable accumulation of pressure. How these and other advantages can be realized through the invention will appear from my description hereinafter of a selected and preferred embodiment.

In the drawings, Fig. I is a perspective view of a cooker conveniently embodying my invention, with the lid raised.

Fig. II is a side view, with one of the parts partly in vertical section.

The cooker here shown is adapted for cooking cakes of annular form like doughnuts. It comprises a mold formed by co-operating members 10, 11, separable as shown in Fig. I. The lower mold 10 forms the top of a base 12, shown as a rectangular casing adapted to house a snap switch indicated at 13, and also a time-control switch mechanism (such as well known in the art, and not shown here) whose operating lever handle 14 appears in Fig. I, as well as its adjusting lever 15 for varying the time the heating current for the molds 10, 11 remains on after the timing device is started into operation by the lever 14. There is also shown an illuminated off-and-on indicator 15a for the heating current. The top mold 11 forms the bottom of a movable cover 16, adapted to be swung down from the open position of Fig. I to the (full-line) closed position of Fig. II, and vice-versa.

The mold members 10, 11 have annular cavities 17, 18 in their abutting surfaces, which coact to form (nine) doughnut-shaped (torus-like) cooking molds when the members 10, 11 are brought together. As shown in Figs. I and II, one of the mold members (11) has annular bevelled ridges 20 around its cavities 18, while the other mold member (11) has corresponding annular bevelled recesses (rabbetts) 21 that fit and seat the ridges 20 when the members 10, 11 are brought together. At the centers of their mold cavities 17, 18, the mold members (10, 11) have similar ridge and rabbett features; or, putting it another way around, one member (10) has bevel-edged circular projections 22 at the centers of its mold cavities (17), while the other member (11) has corresponding bevel-edged circular recesses 23 that fit and seat the projections 22.

The cover 16 is mounted on a carrier 25 which is swingably connected to the cover 16, as well as to the base 12. As shown in Fig. II, the carrier 25 is a lever fulcrumed at 26 on the base 12, in a hollow bracket 27 projecting rearward from said base just below the lower mold member 10, and extending upward and forward across the cover 16 to a handle 28 over the front of the device. The lever 25 is bent or curved forward at 30 over the top of the bracket 27, and is bent upward over the middle of the cover 16 where it is pivoted at 32 in the cleft of a bracket 33 upstanding from the center of the cover 16. Preferably, the bolts 26, 32 are somewhat loose in their holes in the lever 25 and in the brackets 27, 33, for reasons that will appear presently.

As shown in Fig. II, the cover 16 is counterbalanced by a (helical) tension spring 34, housed in the base or casing 12, and connected to an extension arm 35 of the carrier lever 25 beyond its fulcrum pivot 26, inside the hollow bracket 27. For this purpose, a rod 36 connected to a member 37 fixed in the rear end of the spring 34 is hooked around a pivot pin 38 on the lever arm 35 within the bracket 27. The fixed connection at the other end of the spring 34 is adjustable, consisting of a screw 40 extending through the front of the base or casing 12 and taking into a member 41 fixed in the front end of the spring 34. By turning the screw 40 one way or the other, the tension of the spring 34 can be varied and adjusted as desired.

In practice, the tension of the spring 34 is preferably made such that when the cover 16 is closed as in Fig. I, the moment of its weight (plus that of the carrier 25) about the pivotal axis at 26 will be a little greater than the corresponding "initial" pull of the spring, so that the cover 16 will remain closed. However, the points of application and leverages of the spring pull at the pivot 38 and of the cover weight, etc., at the pivot 32 about the carrier pivot 26 are so correlated (as shown in Fig. II) that when the cover 16 is raised somewhat (as to the dot-and-dash position of Fig. II) these two opposing forces will be exactly balanced, and the cover 16 will therefore be in neutral equilibrium; if the cover 16 is raised a little further, the gravity moment will diminish while the spring-pull moment will increase, remain unchanged, or diminish less rapidly than the gravity moment, and so the cover 16 will automatically open still further, even to the limit permitted by engagement of the carrier 25 with the stop portion 42 of the bracket 27; and if the cover 16 is depressed below the neutral dot-and-dash position of Fig. II, it will automatically close the rest of the way. The neutral position of the cover 16 can, of course, be varied and adjusted, by adjusting the initial tension of the spring 34, so as to be either higher or lower than in Fig. II.

In practice, the cover 16 is raised as shown in Fig. I, the lower mold cavities 17 are charged with batter or dough (after having preferably been greased to prevent the product from sticking), the cover 16 is lowered and closed as in Fig. II, and the heating current is turned on and the timing mechanism started by proper manipulation of the lever handle 14. After the proper time has elapsed, the timing mechanism "times out" and automatically shuts off the heating current from both of the molds 10, 11; whereupon the cover 16 is opened, and the product removed.

Owing to the mode of mounting and the looseness of the pivots at 26, 32, the cover 16 has considerable freedom of self-adjustment relative to the base 12. When, therefore, the cover 16 is closed, it is properly aligned with the base 12, so as to bring their mold cavities 17, 18 automatically into registry, by the coaction of the bevelled surfaces at 20, 21 and 22, 23. At the same time, any small portions of batter that may have spilled over the edges of the lower mold cavities 17 will be pinched off by the ridges 20. The cover 16 being free to remain parallel to the base 12 even at a considerable distance above it, and tending to close automatically although very nearly counterbalanced, any slightly excessive charge of batter in the mold cavities 17, 18 will easily cause the cover 16 to rise slightly as the batter cooks and rises, without throwing the cover 16 askew or out of parallel with the base 12. The delicate partial balance of the cover 16 when closed—i. e., the slight excess of the (closing) gravity moment over the (opening) spring moment, allows the cover 16 to yield and rise easily with the expansion of the batter or dough, and obviates any possibility of accumulation of pressure that might blow the dough out of the molds 17, 18 or throw the cover 16 open altogether.

Having thus described my invention, I claim:—

A cooker of the type described comprising a base with a heated top having annular mold cavities therein, a cover with a heated bottom having annular mold cavities for cooperation with those of the base to form cooking molds, said base and cover cavities embodying integrally-formed circumferentially-coacting beveled ridges and corresponding recesses, similar ridges and recesses around projections centrally of the several mold cavities, an angled carrier pivotally connected in the cleft of a bracket upstanding centrally from the cover, said carrier being fulcrumed in a hollow bracket at the back of the cooker base and embodying a rearwardly-directed extension arm, the pivotal and fulcrum axes being loose in their respective bearings so that the cover can freely centralize itself over the base, a tension spring intermediate a pivot on the carrier extension arm and an adjuster screw passing through the front wall of the cooker base whereby the cover is accurately-poised and normally-positioned somewhat-raised relative to the base, and a stop in the hollow bracket for coaction with a downwardly-angled portion of the carrier to limit opening of the cover.

JAMES J. KAUFMANN.